United States Patent Office 2,839,050
Patented June 17, 1958

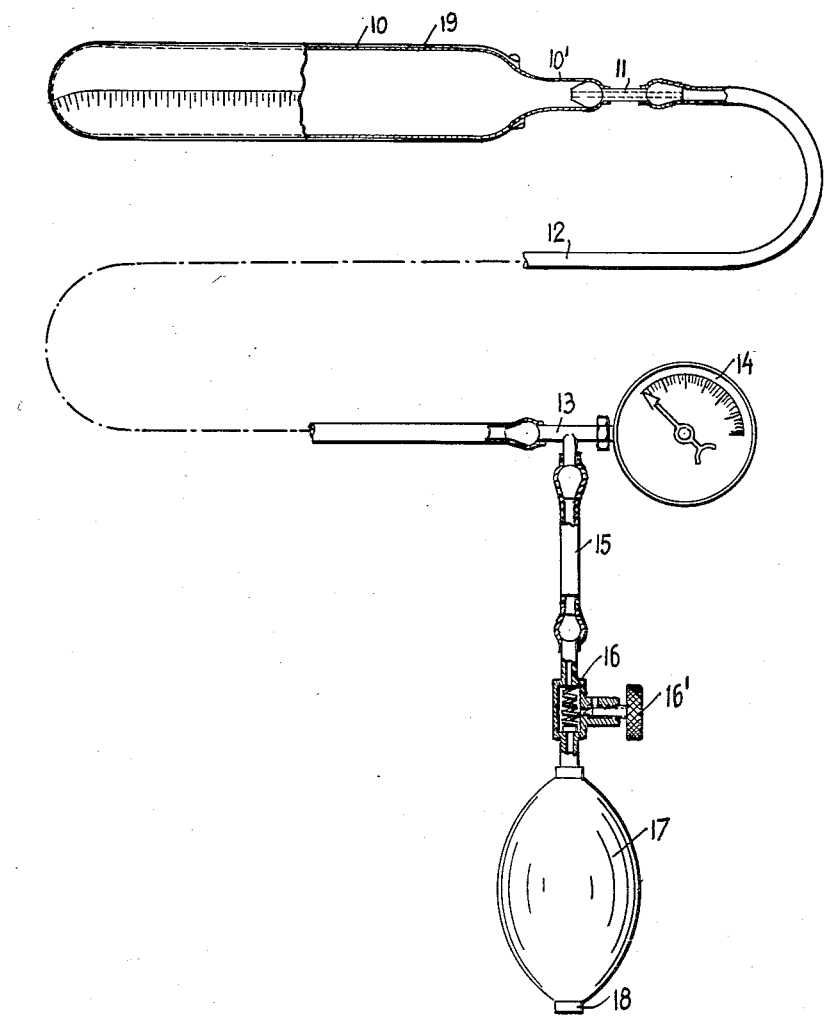

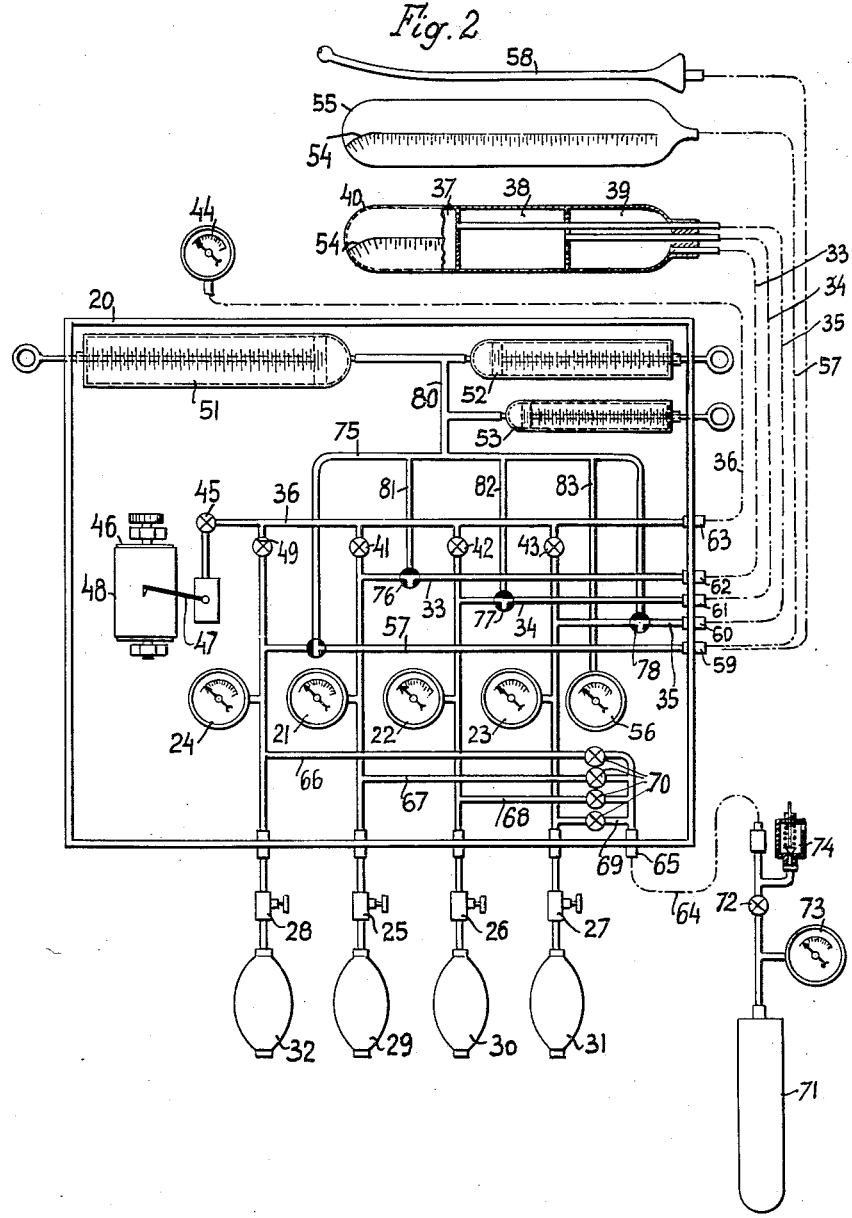

2,839,050

DEVICE FOR MEASURING THE TONUS OF THE MUSCULAR SYSTEM OF THE FLOOR OF THE VAGINA, PELVIS AND ADJACENT AREAS

Kurt Sokol, Bremen, Germany

Application November 7, 1956, Serial No. 620,931

5 Claims. (Cl. 128—2)

The present invention relates to a device for diagnostically measuring the tonus and treatment of the muscle system of the floor of the vagina, pelvis and adjacent areas, and especially for measuring the strength and size of the muscle system of the vagina and pelvis and the intensity of the contraction of the vagina. Such measurements are important for the physician especially for diagnostic and therapeutic purposes. The device according to the invention may be advantageously employed in connection with female incontinence of urine and in connection with conditions resulting from a delivery such as descensus etc.

It has been suggested for purposes of insertion of an instrument into the sphincter muscles to provide such instrument with an elastic cover and to blow up said cover by a blowing device equipped with a pressure gauge. With such an instrument, a tube consisting of flexible material and closed at its front end is slipped over a rigid core, is connected to the head of the core, and has its rear end clamped-in between flanges. During the blowing-up operation, the elastic cover bulges more or less into the shape of a ball. Such instruments are unsuitable for insertion into the vagina even if the instrument is somewhat bent. The shape of the vagina of the various patients differs considerably as to width and curvature.

Furthermore, such instruments having a rigid core may under certain circumstances cause physical damage.

Massaging devices have been suggested which consist of a bent tube usually made of hard rubber and having their end or another portion thereof provided with a small inflatable balloon. By supplying air into or discharging air from such balloon by means of a manually operable blowing device, a massaging can be carried out near the portio or at a portion of the wall of the vagina.

It is an object of this invention to provide an instrument for insertion into the vagina which when being inserted will be able to adapt itself to the various shapes which the vagina may have.

It is another object of this invention to provide an instrument of the type set forth in the preceding paragraph which when being inserted into the vagina will completely evenly rest against the entire wall of the vagina. These and other objects and advantages of the invention will appear more clearly from the following specification in connection with the accompanying drawings in which:

Fig. 1 diagrammatically illustrates an instrument according to the present invention provided with a manually operable blowing device and with a pressure gauge.

Fig. 2 illustrates an instrument according to the invention which is subdivided into chambers and provided with means for withdrawing and simultaneously measuring the respective quantity of air, while also showing the connection of an uterus catheter to the instrument.

The instrument according to the present invention is characterized primarily by an elastic substantially cylindrical hollow body closed at the front end which has a length and diameter approximately corresponding to the vagina and which is completely flexible without a rigid core. This instrument is such that when being pumped-up is adapted elastically and evenly to rest against the entire wall of the vagina in conformity with the respective physiological conditions.

According to a further development of the invention, the instrument is subdivided and has connected thereto means for withdrawing and simultaneously measuring the respective quantity of air. According to a further feature of the invention, for purposes of insufflation of the fallopian tubes by means of an uterus catheter, a source of carbonic acid may be connected to the pressure conduit of the manually operable blowing means while interposing valves.

Referring now to the drawing in detail, and Fig. 1 thereof in particular, the instrument illustrated therein comprises an insertion member 10 adapted to be inserted into the vagina. This insertion member 10 is closed at the front and has the shape of a cylindrical hollow body approximating the length and the diameter of the vagina. The hollow member 10 is completely flexible and free from a stiffening member and is adapted when being blown-up elastically to rest along its entire length upon the wall of the vagina.

The cylindrical hollow member is narrowed at its open end 10' and is slipped over a connecting piece 11 having its ends strengthened by bulbous portions. The rear end of this connecting piece 11 has one end of a rubber hose 12 connected thereto, whereas the other end of said hose 12 is connected to a T-member 13 provided with a pressure gauge 14. To one end of the T-member 13 there is connected a hose 15 which through a valve 16 leads to a rubber ball 17 acting as manually operable blowing means. The ball 17 has its bottom provided with a valve 18. The valve 16 is designed as a check-valve. The gauge is gauged for millimeter mercury pressure and may be connected with a mechanical or photo-electrical registering device or with both. A condom 19 may be slipped over the cylindrical flexible hollow member 10 and prior to the insertion of the instrument it may be covered with vaseline or other substances which will facilitate the sliding of the instrument into the vagina. Said substances may contain ingredients which are adapted to vary the tonus in order to determinate the reaction of the vagina to such ingredients during the examination.

The valve 16 is designed in the manner customary in connection with blood pressure measuring instruments. The valve 16 is adapted to act as check-valve and to retain the air pumped by the blowing device 17 into the instrument. Said valve 16 may also be used as discharge valve by actuation of the control screw 16' so as to discharge air from the instrument and reduce the pressure up to the desired filling pressure. The control screw is then tightened again so that the pressure in the instrument closed on all sides will be retained. For purposes of venting, the screw is opened so that the pressure will be released and the instrument can be easily removed from the vagina.

It is, of course, understood that instead of the manually operable blowing device 17 any other blowing device may be used, for instance an air compressor in connection with valves interposed between said compressor and said instrument.

For purposes of gymnastically treating and strengthening the muscle system of the pelvis, the member 10 is inserted into the vagina and the variations indicated by the gauge 14 as a result of the contraction of the muscles of the vagina are observed and registered. The said variations should amount to approximately from 10 to 30 millimeters mercury column. Within a short time, an increase in the contraction ability will be noticed. In practice it has been found that the at random contractions of the muscle system of the vagina have a starting value of approximately 40 millimeters mercury while the maximum obtained pressures are approximately from 60 to 65 millimeters mercury so that the increase amounts to approximately 20 millimeters mercury. When treating a patient for several weeks with the same starting values, maximum pressure values up to 190 millimeters mercury have been obtained.

With the embodiment of the invention as diagrammatically shown in Fig. 2, a plurality of gauges 21, 22, 23 and 24 are arranged in a container 20, said gauges being gauged for millimeter mercury pressure. The gauges communicate with the manually operable blowing devices in form of rubber balls 32, 29, 30 and 31 through control valves 28, 25, 26 and 27. The conduits or hoses 33, 34 and 35 respectively lead to chambers 37, 38 and 39 of an insertion member 40 which is formed by an elastic cylindrical thin walled hollow body closed at the front end and corresponding to the vagina as to length and diameter. This hollow body is completely flexible and without any rigid supporting core.

The air conduits 33, 34, 35 and 36 communicate through shut-off valves 41, 42 and 43 with the gauges 44 and further communicate through a shut-off valve 45 with a registering device 46 comprising a writing lever 47 and a paper band 48. After correspondingly adjusting the control valves and shut-off valves by manipulation of the rubber balls 29 to 32, the chambers 37, 38 and 39 of the instrument 40 inserted into the vagina may individually or together be filled with air, for instance at a pressure of 40 to 80 millimeters mercury whereupon the patient is caused to increase the pressure in the individual chambers by contracting the muscle system of the vagina up to the limit of the contraction ability thereof. The pressures are then read by the physician at the gauges 21, 22 and 23 and by the patient at the gauge 44. If desired, these pressures are then by means of the registering device 46 written down upon the moving paper band 48.

For purposes of simplicity, Fig. 2 shows one registering device only. However, it is obvious that two further registering devices may be connected with the instrument and may communicate with the system of the conduits 33, 34 and 35 in such a manner that selectively one registering device only will register the pressure increase in one of the chambers or simultaneously occurring in all chambers, or a plurality of registering devices may individually register the respective pressure increase in the various chambers.

If desired, all chambers may simultaneously be subjected to the same pressure by opening the shut-off valve 41, 42 and 43 so that the insertion instrument 40 will properly rest along the entire wall of the vagina. Thereupon through shut-off valve 49 and three-way valve 50 the entire system has the air withdrawn by means of the suction pumps 51, 52 and 53 up to the pressure of zero or below zero millimeter mercury.

The total of the measured quantity read on the gauged piston rods of the suction pumps 51, 52 and 53 will then be an indication for the volume of the vagina. It is to be understood that in view of the variations of the air pressure and the volume of the entire device connected with the pumps, certain corrections will have to be effected, also taking into consideration the respective barometer reading. These calculations, however, are necessary only if the absolute volume of the vagina is to be determined.

Comparative values can also be ascertained without the said calculations if care is taken that during the various measuring operations the gauge readings will be the same prior and following the evacuation of the system.

The length of the vagina can be ascertained by means of a centimeter scale 54 arranged on the insertion instrument 40.

For a simpler and more precise measurement of the volume of the vagina, there is provided a second insertion instrument which is not subdivided into chambers and which is provided with a scale 54, a separate gauge 56, manually operable blowing means 32, a valve 28 and a gauge 24. The conduit 75 has connected thereto a conduit 80 leading to the suction pumps 51, 52 and 53. Furthermore, the conduits 33, 34 and 35 are with conduits 81, 82 and 83 and three-way valve 76, 77 and 78 and shut-off valve 50 connected to the conduits 75 and 80 respectively.

By means of the manually operable blowing means 32 air is pumped through three-way valve 50 and conduit 70 into the insertion instrument 55 after it has been inserted into the vagina until a certain pressure has been created therein. Thereupon the three-way valve 50 is adjusted so that through conduit 80, the gauge 56 only and the suctions pumps 51, 52 and 53 communicate with the insertion instrument 55. Thereupon the respective pressure is read at gauge 56. Then the suction pumps are actuated so as to evacuate the air from the system until the gauge 56 indicates a slight pressure below zero millimeter mercury. The withdrawn quantity of air is then read at the piston rods of the suction pumps.

A plurality of suction pumps 51, 52 and 53 of different volume, for instance of 200, 100 and 75 cubic centimeters are provided in order to be able to receive any practically occurring quantity of air which can be read on a scale provided on the piston rods and based on the volume. This reading can be effected with great precision particularly with smaller suction pumps.

If the instrument is to be used for insufflation of the fallopian tubes, an uterus catheter 58 may be connected through the connections 59, 60, 61, 62 and 63 with one of the pressure conduits 33, 34, 35, 36 and 37 while instead of the respective insertion instrument 55 the uterus catheter 58 is connected to the pressure conduit 57.

It is also possible to connect a simple non-subdivided insertion instrument 55 or uterus catheter 58 with one pressure conduit only, for instance the conduit 36.

For purposes of insufflation by means of carbonic acid, a source of carbonic acid 71 may be connected to the pressure conduit by means of a conduit 64, said pressure conduit communicating with the uterus catheter 58 while the respective manually operable blowing means 29, 30, 31 and 32 is disconnected. To this end, the carbonic acid conduit 64 may be connected either to one of the shut-off valves 25, 26, 27, and 28 instead of the blowing means 29, 30, 31 and 32, or the conduit 64 may be connected to the respective pressure conduit 33, 34, 35, 36, 57 through a connection 65, pressure conduit 66, 67, 68 and 69 and interposed shut-off valves 70. In this instance, the corresponding shut-off valves 25—28 would have to be closed.

The carbonic acid conduit 64 communicates with a carbonic acid source comprising the carbonic acid container 71, a reducing valve 72, a gauge 73 and a safety or relief valve 74. The carbonic acid source or supply system represents a small auxiliary device which is easily handled and can easily be connected to the gynocological examination table.

The venting of the entire system can be effected in a simple manner through valves 25, 26, 27 and 28. For particular conditions it is possible to connect the suction pumps 51, 52 and 53 through suction conduit 75 and three-way valve 76, 77 and 78 with the respective pressure conduits to thereby bring about a reduction in the pressure. In this way not only a complete elimination of pressure but even a pressure below atmospheric pressure can be obtained if such should be necessary.

Instead of an uterus catheter it is also possible to employ special cannulae, trocars etc. provided with optical instruments for purposes of employing douglascopy and laparoscopy.

The new instrument according to the present invention may be employed in all instances where the vagina has been unduly weakened or has been unduly enlarged as may be the case after a delivery, after tears or insections or other gynocological operations.

The insertion member may consist of any suitable elastic inflatable material, especially of rubber, plastic material or the like.

It is, of course, understood, that the present invention is, by no means, limited to the particular constructions shown in the drawing but also comprises any modification within the scope of the appended claims.

What I claim is:

1. An apparatus for exercising and diagnostically measuring the tonus of the muscle system of the floor of the vagina, pelvis and adjacent areas, which comprises in combination: an inflatable insertion member adapted to be inserted into the vagina and comprising an elastic self-supporting hollow cylindrical body closed at the front end and having an opening at the rear end, said insertion member being subdivided into a plurality of chambers, hose means extending through said opening into each of said chambers, blowing means having associated therewith three-way valve means and communicating with said hose means for selectively blowing air into each of said chambers, and gauge means communicating with said hose means for measuring the air pressure in each of said chambers.

2. An apparatus for exercising and diagnostically measuring the tonus of the muscle system of the floor of the vagina, pelvis and adjacent areas, which comprises in combination: an inflatable insertion member adapted to be inserted into the vagina and comprising an elastic self-supporting hollow cylindrical body closed at the front end and having an opening at the rear end, said insertion member being subdivided into a plurality of chambers, hose means extending through said opening into each of said chambers, blowing means having associated therewith three-way valve means and communicating with said hose means for selectively blowing air into each of said chambers, gauge means communicating with said hose means for measuring the air pressure in each of said chambers, suction pump means arranged for withdrawing air from said chambers, and measuring means for measuring the quantity of air withdrawn from said chambers.

3. An apparatus according to claim 2, which includes a writing instrument operatively connected at least with said gauges for writing down the respective indications on said gauges.

4. An apparatus for exercising and diagnostically measuring the tonus of the muscle system of the floor of the vagina, pelvis and adjacent areas, which comprises in combination: at least one inflatable insertion member adapted to be inserted into the vagina and comprising an elastic self-supporting hollow cylindrical body closed at the front end and having an opening at its rear end, first hose means having one end connected to said opening, blowing means having a three-way valve associated therewith and communicating with the other end of said hose means, additional hose means, additional blowing means, said additional hose means communicating with said additional blowing means, valve means associated with said additional blowing means, said additional blowing means being arranged for communication with a source of carbonic acid, and an uterus catheter connected to said additional hose means.

5. An arrangement according to claim 4, in which said additional blowing means communicates with a source of carbonic acid comprising a container for carbonic acid, a reducing valve, a gauge and a check-valve.

References Cited in the file of this patent

UNITED STATES PATENTS

| | | |
|---|---|---|
| 476,698 | Taylor | June 7, 1892 |
| 525,785 | Hurdle | Sept. 11, 1894 |
| 2,441,237 | Davies | May 11, 1948 |
| 2,541,520 | Kegel | Feb. 13, 1951 |